United States Patent
Li et al.

(10) Patent No.: US 9,660,473 B2
(45) Date of Patent: May 23, 2017

(54) CONTROLLERS FOR DC/DC CONVERTER

(71) Applicant: O2Micro Inc, Santa Clara, CA (US)

(72) Inventors: Gang Li, Shenzhen (CN); Guoyong Guo, San Jose, CA (US); Laszlo Lipcsei, Campbell, CA (US)

(73) Assignee: O2Micro Inc, Santa Clara, CA (US)

( * ) Notice: Subject to any disclaimer, the term of this patent is extended or adjusted under 35 U.S.C. 154(b) by 347 days.

(21) Appl. No.: 14/543,380

(22) Filed: Nov. 17, 2014

(65) Prior Publication Data

US 2016/0141892 A1   May 19, 2016

(51) Int. Cl.
  *H02J 7/00*   (2006.01)
  *H02M 3/156*   (2006.01)

(52) U.S. Cl.
  CPC ............ *H02J 7/007* (2013.01); *H02J 7/0077* (2013.01); *H02M 3/156* (2013.01); *H02J 7/0052* (2013.01); *H02J 2007/0059* (2013.01)

(58) Field of Classification Search
  CPC ........ H02J 7/007; H02J 7/0052; H02J 7/0072; H02M 3/156
  USPC .................................. 320/107, 134, 140, 164
  See application file for complete search history.

(56) References Cited

U.S. PATENT DOCUMENTS

| | | |
|---|---|---|
| 6,166,521 A | 12/2000 | Mercer et al. |
| 2006/0232241 A1 | 10/2006 | Lu et al. |
| 2007/0194759 A1* | 8/2007 | Shimizu ............... H02J 7/0016 320/166 |
| 2012/0091816 A1 | 4/2012 | Liu et al. |
| 2015/0188351 A1 | 7/2015 | Jiang et al. |

FOREIGN PATENT DOCUMENTS

| | | |
|---|---|---|
| CN | 103683357 A | 3/2014 |
| JP | 2004282846 A | 10/2004 |

\* cited by examiner

*Primary Examiner* — Edward Tso
*Assistant Examiner* — Aaron Piggush (57) ABSTRACT

A DC/DC converter converts an input DC voltage to an output DC voltage and charges a battery. The DC/DC converter includes: a DC/DC controller, operable for generating a driving signal according to a target value for the output voltage and a first detection signal indicative of the output voltage level to control switching circuitry and to adjust the output voltage level; and a battery charging controller, coupled to the DC/DC controller and the battery, that is operable for receiving the first detection signal indicative of the output voltage level and a second detection signal indicative of a battery voltage level, and for generating a loop control signal according to the first detection signal and the second detection signal to adjust the target value for the output voltage, wherein the difference between the first detection signal and the second detection signal indicates the amount of a battery charging current.

17 Claims, 6 Drawing Sheets

CONTROLLERS FOR DC/DC CONVERTER

TECHNICAL FIELD

Embodiments according to the present invention relate to controllers for DC/DC converters, and in particular to controllers and methods for controlling DC/DC converters with variable output voltages.

BACKGROUND

DC/DC converters are used to convert an input DC (direct current) voltage to an output DC voltage. A DC/DC converter may buck or boost the input DC voltage. One type of buck converter is a synchronous buck converter. This type of converter typically has a controller, a driver, a pair of switches, and an LC (inductor-capacitor) filter coupled to the pair of switches. The controller provides a control signal (e. g., a pulse width modulated signal) to the driver, which then drives the pair of switches, e. g., a high side switch and a low side switch. The driver alternately turns each switch on and off, thereby controlling the inductor current and the output voltage of the DC to DC converter.

In general, if the pulse width modulated (PWM) signal is high, the high side switch is on and the low side switch is off. This state of switches will be referred to herein as a "switch on" state. In this state, the inductor is coupled to the input voltage source. Accordingly, the inductor current begins to ramp up, and stores the magnetic energy into the inductor. If the PWM signal is low, the high side switch is off and the low side switch is on. This state of switches will be referred to as a "switch off" state. In this state, the magnetic energy stored in the inductor starts to be released. Accordingly, the inductor current begins to ramp down. The duty cycle of the PWM signal determines the time on for the switch on state and the time off for the switch off state. The duty cycle can be adjusted by monitoring the inductor current via a sense resistor or by comparing the output voltage with a reference voltage level.

Figure 1A:
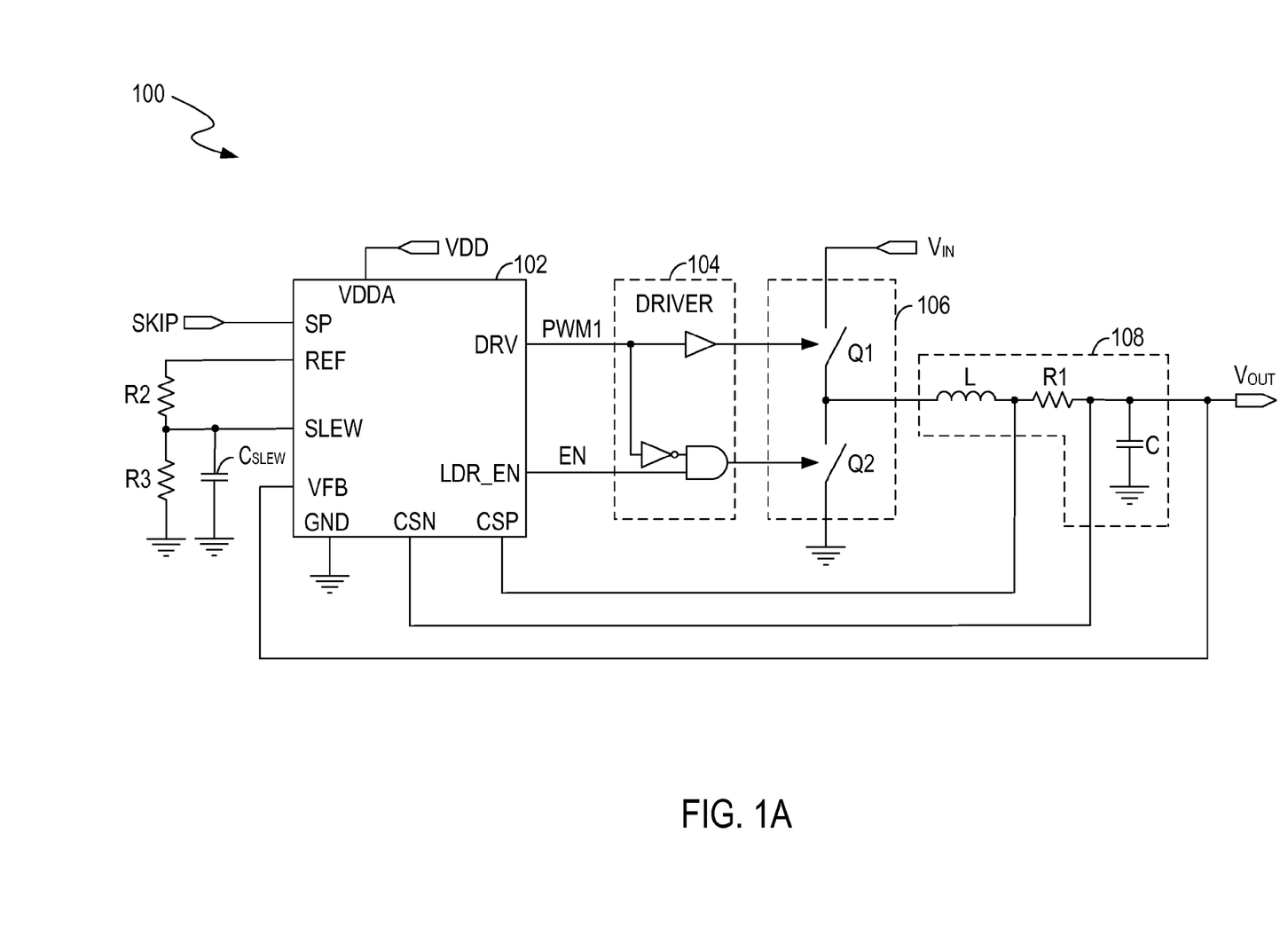
FIG. 1A shows an existing DC/DC converter including a DC/DC controller.

FIG. 1A shows an existing DC/DC converter 100 operable for converting an input DC voltage $V_{IN}$ to an output DC voltage $V_{OUT}$. The illustrated DC/DC converter 100 is a synchronous buck converter, generally including a DC/DC controller 102, a controller 104, a pair of switches (switching circuitry) 106 including a high side switch Q1 and a low side switch Q2, and a low pass filter 108. The low pass filter 108 includes an inductor L and a capacitor C. The low pass filter 108 further includes a sense resistor R1 coupled to the inductor L, operable for providing a feedback voltage level to terminals CSN and CSP of the DC/DC controller 102, which is indicative of the amount of current flowing through the inductor L.

The DC/DC controller 102 has a target input terminal SLEW where the desired output voltage can be set. A capacitor $C_{SLEW}$ charges based on the value of the resistors in the resistor divider R2/R3 and the value of the reference voltage REF. The slew voltage on the capacitor $C_{SLEW}$ increases from zero to a peak value, which is determined by the value of the resistors in the resistor divider R2/R3 and the value of the reference voltage REF. The terminal VFB of the DC/DC controller 102 receives a detection signal indicative of the output voltage $V_{OUT}$. Based on the peak value of the ramp voltage (e. g., the target output voltage) and the detection signal received by the terminal VFB (indicative of the output voltage $V_{OUT}$), the DC/DC controller 102 can provide a PWM signal PWM1 and a low side switch enable signal EN to the controller 104. Based on the PWM signal PWM1 and the low side switch enable signal EN, the controller 104 controls the state of the high side switch Q1 and the low side switch Q2.

Figure 1B:
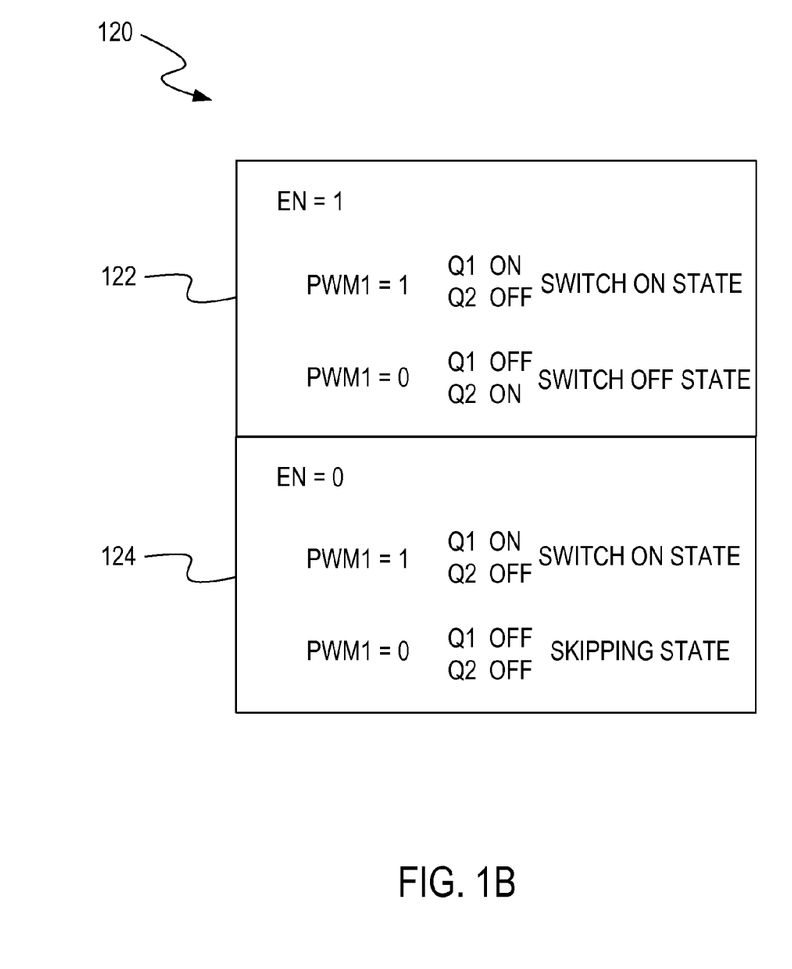
FIG. 1B illustrates various switch states of the high side switch and the low side switch in FIG. 1A for various pulse width modulated signals and low side switch enable signals.

FIG. 1B is a table 120 illustrating examples of various switch states of the high side switch Q1 and the low side switch Q2 in FIG. 1A for various PWM and EN signals. At block 122, the low side switch enable signal EN is a digital one. If the PWM signal PWM1 is a digital one, the high side switch Q1 is on and the low side switch Q2 is off, and then the switching circuitry 106 is in a switch on state. If the PWM signal PWM1 is a digital zero, the high side switch Q1 is off and the low side switch Q2 is on, and then the switching circuitry 106 is in a switch off state. At block 124, the low side switch enable signal EN is a digital zero. If the PWM signal PWM1 is a digital one, the high side switch Q1 is on and the low side switch Q2 is off, and then the switching circuitry 106 is in a switch on state. If the PWM signal PWM1 is a digital zero, both the high side switch Q1 and the low side switch Q2 are off, and then the switching circuitry 106 is in a switch disabled state (skipping mode).

During operations, the ramp voltage received at the terminal SLEW of the DC/DC controller 102 increases from zero to the peak value. The DC/DC controller 102 adjusts the low side switch enable signal EN and the duty cycle of the pulse-width modulation signal PWM1 according to the peak value (the target output voltage) and the detection signal received at the terminal VFB (indicative of the output voltage $V_{OUT}$), so as to adjust the output voltage $V_{OUT}$ to the target output voltage set by the peak value.

However, the peak value of the ramp voltage of the DC/DC controller 102 is a constant value determined by the value of the resistors in the resistor divider R2/R3 and the value of the reference voltage REF. The adjusted output voltage $V_{OUT}$ is also constant rather than a variable value, which makes it difficult to meet the application requirement for variable output voltages (e. g., battery charging).

SUMMARY

Embodiments according to the present invention solve the aforementioned drawbacks by providing improved controllers and methods for controlling DC/DC converters with variable output voltages.

In an example embodiment, a DC/DC converter is provided. The DC/DC converter is operable for converting an input DC voltage to an output DC voltage and for charging a battery. The DC/DC converter includes: a DC/DC controller, operable for generating a driving signal according to a target value for the output voltage and a first detection signal indicative of the level of the output voltage to control a switching circuitry and adjust the output voltage; and a battery charging controller, coupled to the DC/DC controller and the battery, that is operable for receiving the first detection signal indicative of the level of the output voltage and a second detection signal indicative of the level of a battery voltage, and for generating a loop control signal according to the first detection signal and the second detection signal to adjust the target value for the output voltage, wherein the difference between the first detection signal and the second detection signal indicates an amount of a battery charging current.

In another example embodiment, a battery charging controller is provided. The battery charging controller is operable for controlling the charging of a battery by a DC/DC converter. The DC/DC converter converts an input DC voltage to an output DC voltage. The battery charging controller includes: a first error amplifier, operable for comparing the difference between a first detection signal indicative of the level of the output voltage and a second detection signal indicative of the level of a battery voltage and a reference current signal indicative of a target value for a battery charging current, wherein the difference between the first detection signal and the second detection signal indicates the amount of the battery charging current; a second error amplifier, operable for comparing the second detection signal and a reference voltage signal indicative of a target value for the battery voltage; and a bias current source, coupled to the first error amplifier and the second error amplifier, that is operable for adjusting a loop control signal according to the comparison results of the first error amplifier and the second error amplifier, thus adjusting a target value for the output voltage so that the DC/DC controller coupled to the battery charging controller accordingly adjusts the output voltage.

In yet another example embodiment, a battery charging control method is provided. The battery charging control method is operable for using a battery charging controller to control the charging of a battery by a DC/DC converter. The DC/DC converter converts an input DC voltage to an output DC voltage. The battery charging control method includes: comparing, by a first error amplifier, the difference between a first detection signal indicative of the level of the output voltage and a second detection signal indicative of the level of a battery voltage and a reference current signal indicative of a target value for a battery charging current, wherein the difference between the first detection signal and the second detection signal indicates the amount of the battery charging current; comparing, by a second error amplifier, the second detection signal and a reference voltage signal indicative of a target value for the battery voltage; and adjusting, by a bias current source coupled to the first error amplifier and the second error amplifier, a loop control signal according to the comparison results of the first error amplifier and the second error amplifier, thus adjusting a target value for the output voltage so that the DC/DC controller coupled to the battery charging controller accordingly adjusts the output voltage.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to embodiments according to the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

Furthermore, in the following detailed description of embodiments according to the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments according to the present disclosure.

Figure 2:
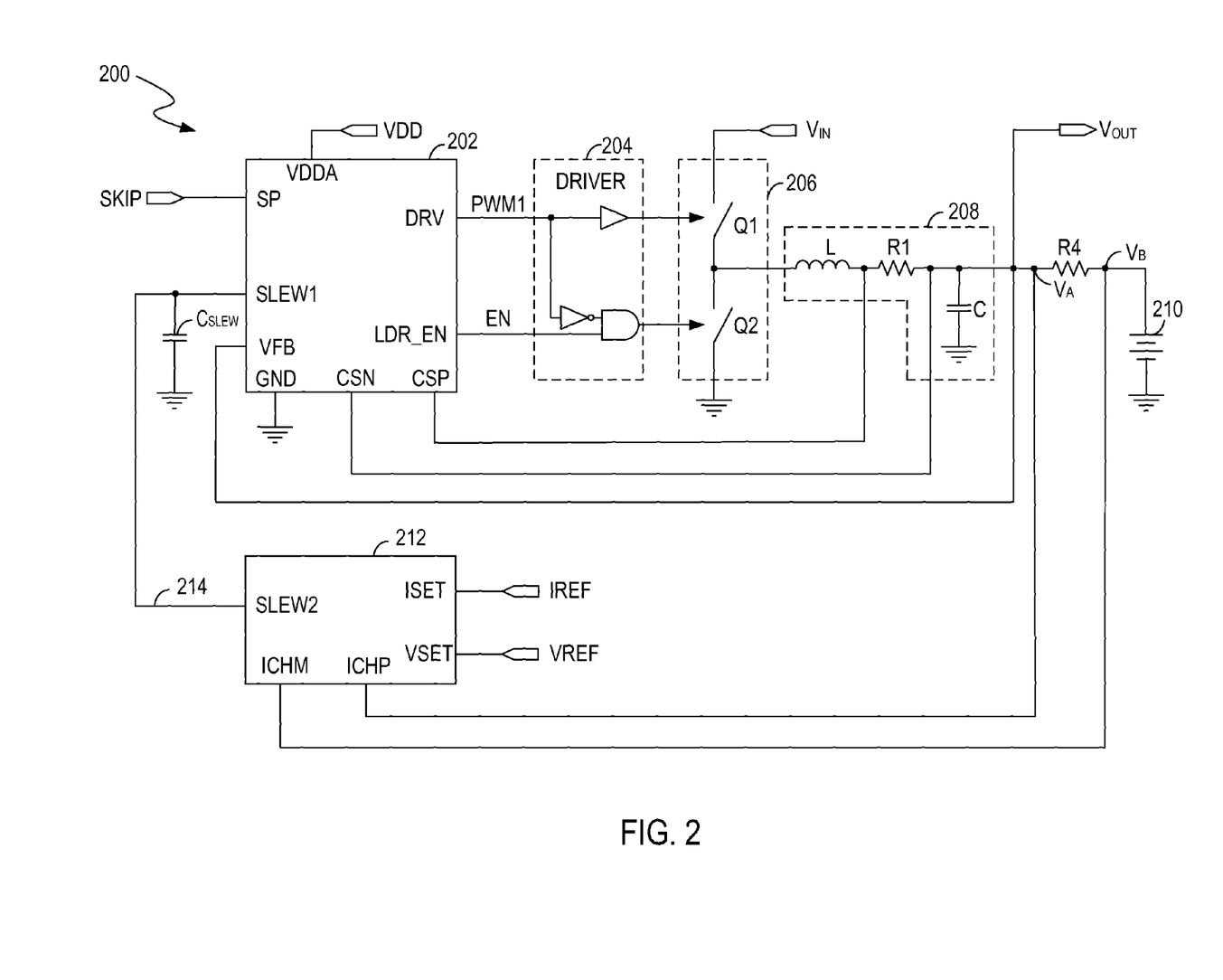
FIG. 2 is a block diagram illustrating a DC/DC converter including a DC/DC controller and a battery charging controller, in an embodiment according to the present disclosure.

FIG. 2 is a block diagram illustrating a DC/DC converter 200 including a DC/DC controller 202 and a battery charging controller 212, in an embodiment according to the present disclosure. The DC/DC converter 200 is operable for converting an input DC voltage $V_{IN}$ to an output DC voltage $V_{OUT}$ and for charging a battery (e.g., a battery 210). As shown in FIG. 2, the DC/DC converter 200 is a synchronous buck converter, including the DC/DC controller 202, a controller 204, a pair of switches (switching circuitry) 206 including a high side switch Q1 and a low side switch Q2, and a low pass filter 208. The low pass filter 208 includes an inductor L and a capacitor C. The low pass filter 208 further includes a sense resistor R1 coupled to the inductor L, operable for providing a feedback voltage level to terminals CSN and CSP of the DC/DC controller 202 indicative of the amount of current flowing through the inductor L. Unlike the DC/DC converter 100 of FIG. 1, the DC/DC converter 200 shown in FIG. 2 can utilize the battery charging controller 212 to provide variable output voltages and to charge the battery 210.

The DC/DC controller 202 includes terminals VDDA, DRV, LDR_EN, SP, CSN, CSP, GND, VFB and SLEW1. The terminal VDDA supplies power to the DC/DC controller 202. The terminal DRV and LDR_EN are respectively operable for providing a pulse width modulated signal PWM1 and a low side switch enable signal EN to the controller 204. Based on the pulse width modulated signal PWM1 and the low side switch enable signal EN, the controller 204 can control the states of the high side switch Q1 and the low side switch Q2. The terminal SP is operable for selectively enabling the skipping mode of the DC/DC controller 202, e.g., when the current flowing through the inductor L in the low pass filter decreases to zero (e.g., the energy storage element is fully discharged), the SKIP signal at the terminal SP is in a first state (e.g., a digital one) so that the high side switch Q1 and the low side switch Q2 are both in off state. The skipping mode is useful for light load conditions, because a new PWM cycle will start when the load discharges the energy storage element (e.g., the capacitor C), thus decreasing the switching losses of the high side switch Q1 and the low side switch Q2.

The terminals CSN and CSP are operable for receiving a first feedback voltage value and a second feedback voltage value indicative of the amount of current value flowing through the inductor L. The terminal GND is coupled to ground. The terminal VFB is operable for receiving a detection signal indicative of the level of the output voltage $V_{OUT}$.

The terminal SLEW1 is operable for setting a target value for the desired output voltage. Unlike the fixed value shown in FIG. 1A, the terminal SLEW1 of FIG. 2 receives a loop control signal 214 from a terminal SLEW2 of the battery charging controller 212. The DC/DC controller 202 adjusts the duty cycle of the pulse width modulated signal PWM1 at the terminal DRV according to the loop control signal 214 at the terminal SLEW1 and the detection signal indicative of the level of the output voltage $V_{OUT}$ at the terminal VFB, so as to control the average current flowing through the inductor L. In such way, the output voltage $V_{OUT}$ is adjusted to the target value for the loop control signal 214, therefore improving the loop control performance (including the bandwidth and the response speed) and providing variable output voltages.

More specifically, the battery charging controller 212 includes the terminals ISET, VSET, ICHP, ICHM, and SLEW2. The DC/DC converter 200 further includes a sense resistor R4, operable for respectively providing voltage values $V_A$ and $V_B$ to the terminals ICHP and ICHM of the battery charging controller 212. As shown in FIG. 2, the voltage value $V_A$ is equal to the output voltage $V_{OUT}$, and the voltage value $V_B$ is equal to the battery voltage of the battery 210. Therefore, the difference between the voltages $V_A$ and $V_B$ at the terminals ICHP and ICHM can indicate the amount of current flowing through the sense resistor R4, i.e., the battery charging current of the battery 210. The terminal ISET is operable for receiving a reference current signal IREF indicative of the target value for the battery charging current $I_{TAR}$ (not shown). The terminal VSET is operable for receiving a reference voltage signal VREF indicative of the target value for the battery voltage $V_{TAR}$ (not shown). In an embodiment, the reference voltage signal VREF is equal to the target value for the battery voltage $V_{TAR}$. In another embodiment, the reference voltage signal VREF is proportional to the target value for the battery voltage $V_{TAR}$; however, the present invention is not so limited. Based on the reference current signal IREF at the terminal ISET, the reference voltage signal VREF at the terminal VSET, and the voltages $V_A$ and $V_B$ at the terminals ICHP and ICHM (e.g., the actual battery charging current and the battery voltage), the battery charging controller 212 adjusts the loop control signal 214 at the terminal SLEW2, which is then output to the terminal SLEW1 of the DC/DC controller 202. The DC/DC controller 202 can adjust the target value for the desired output voltage according to the loop control signal 214 at the terminal SLEW1, thus adjusting the output voltage $V_{OUT}$. In that way, the present invention provides a variable output voltage $V_{OUT}$, improves the loop control performance of the DC/DC converter 200, obtains a faster response speed, and ensures the stability of the loop control.

Figure 3:
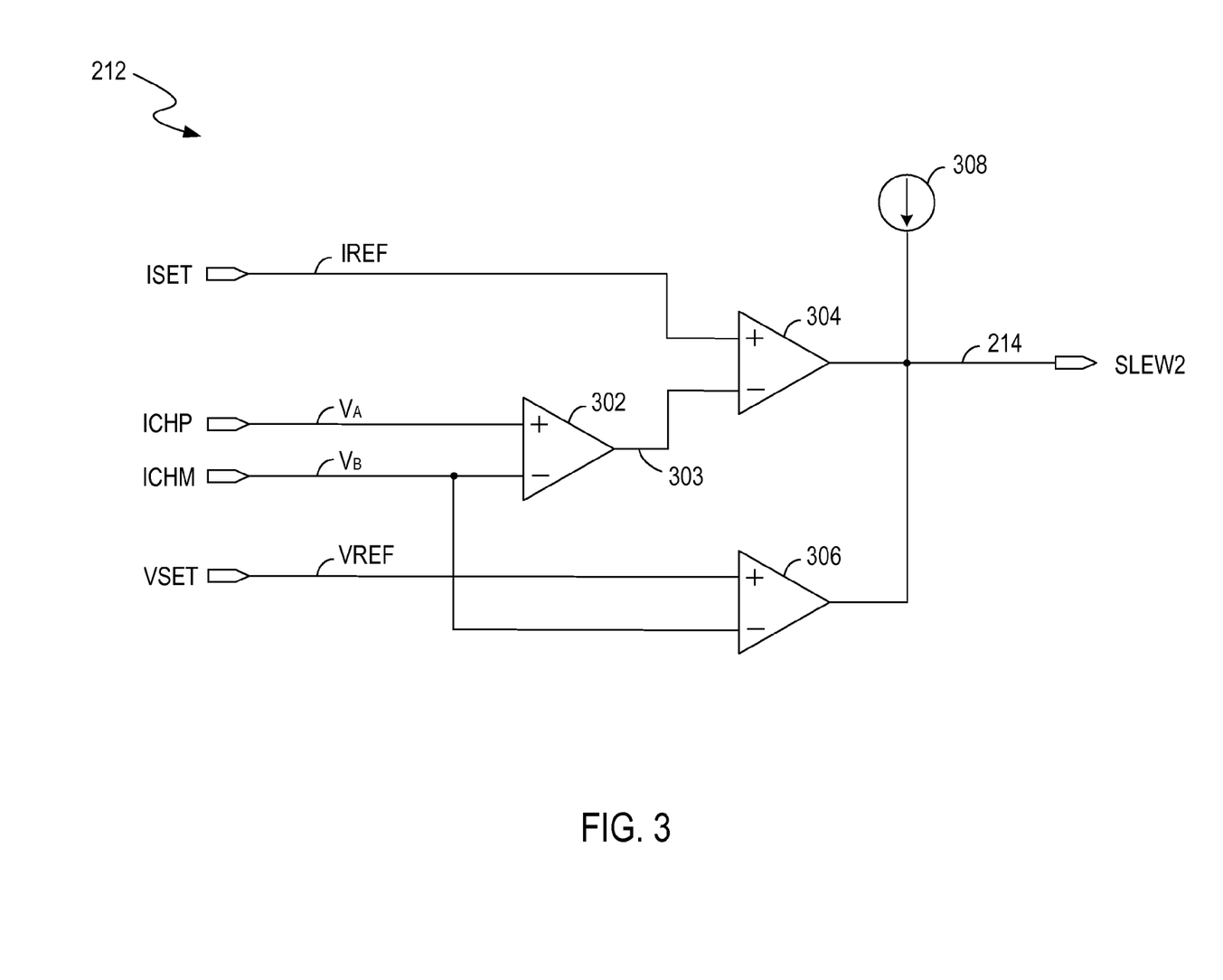
FIG. 3 is a block diagram illustrating an embodiment of the battery charging controller in FIG. 2.

FIG. 3 is a block diagram illustrating an embodiment of the battery charging controller 212 in FIG. 2. As shown in FIG. 3, the battery charging controller 212 includes error amplifiers 302, 304, and 306. The battery charging controller 212 further includes a bias current source 308.

The error amplifier 302 compares the voltage $V_A$ and $V_B$ at the terminals ICHP and ICHM, and generates an output 303 indicative of the difference between the voltages $V_A$ and $V_B$ (the battery charging current of the battery 210). The error amplifier 304 compares the output 303 of the error amplifier 302 and the reference current signal IREF at the terminal ISET (indicative of the target value for the battery charging current $I_{TAR}$ (not shown)). The error amplifier 306 compares the voltage $V_B$ at the terminal ICHM (the battery voltage of the battery 210) and the reference voltage signal VREF at the terminal VSET (indicative of the target value for the battery voltage $V_{TAR}$ (not shown)). Under the combined effect of the error amplifiers 304, 306 and the bias current source 308, the battery charging controller 212 adjusts the loop control signal 214 at the terminal SLEW2 according to the comparison results of the error amplifiers 304 and 306, thus adjusting the output voltage of the DC/DC converter 200, the battery voltage, and the battery charging current. In the example of FIG. 3, the error amplifiers 304 and 306 are specially designed only to sink current, and not to source current. However, one skilled in the art will understand that the above description is to be considered in all respects as illustrative and not restrictive. On the contrary, other suitable elements and structures can also be utilized to implement the technical scheme of the present invention.

Figure 4:
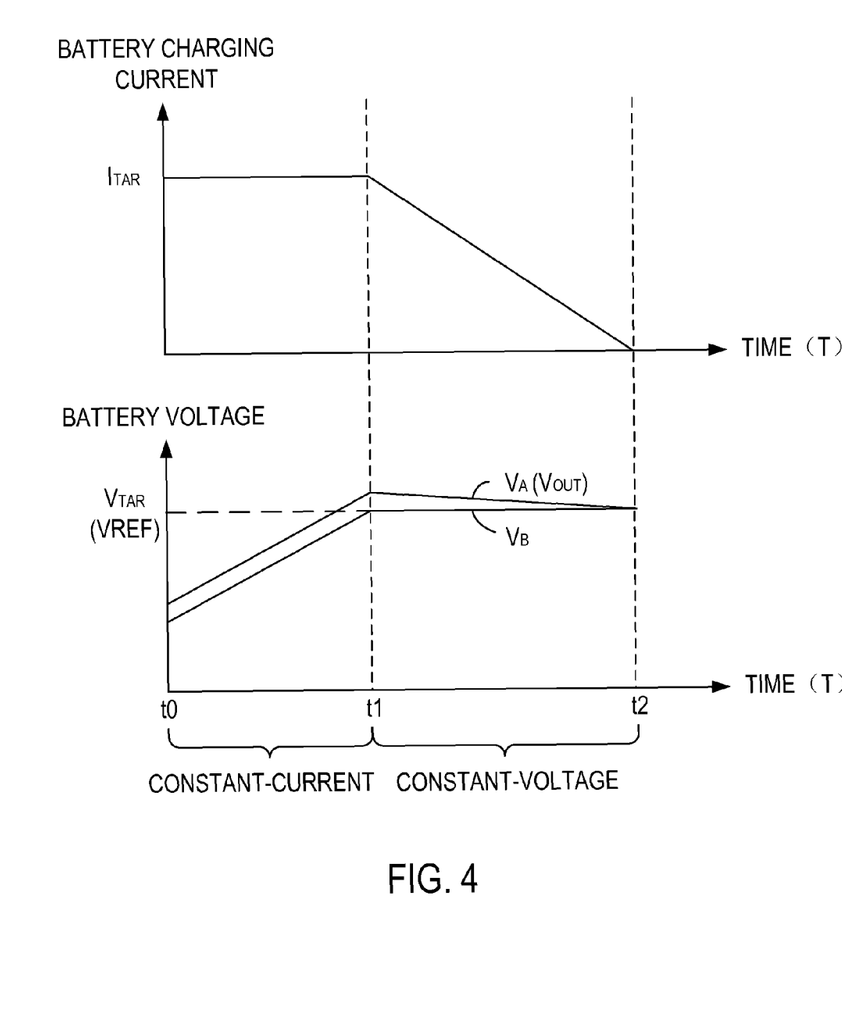
FIG. 4 shows waveforms of signals associated with the battery charging controller in FIG. 2 in an embodiment according to the present invention.

FIG. 4 shows waveforms of signals associated with the battery charging controller in FIG. 2 in an embodiment according to the present invention. FIG. 4 is described in combination with FIG. 3. The battery charging process generally includes two phases, respectively called a constant-current charging phase and a constant-voltage charging phase. During the constant-current charging phase, the DC/DC converter 200 charges the battery 210 with a predetermined constant charging current (e.g., the target value for the battery charging current $I_{TAR}$ determined by the reference current signal IREF at the terminal ISET), while the battery voltage $V_B$ gradually increases. Once the battery voltage $V_B$ increases to a predetermined constant charging voltage (e.g., the target value for the battery voltage $V_{TAR}$ determined by the reference voltage signal VREF at the terminal VSET), the battery charging process changes from the constant-current charging phase to the constant-voltage charging phase. During the constant-voltage charging phase, the DC/DC converter 200 charges the battery 210 with the predetermined constant charging voltage (e.g., the target value for the battery voltage $V_{TAR}$ determined by the reference voltage signal VREF at the terminal VSET), while the battery charging current gradually decreases from the predetermined constant charging current (e.g., the target value for the battery charging current $I_{TAR}$ determined by the reference current signal IREF at the terminal ISET) to another predetermined current value (e.g., 0). In this way, the battery charging process is completed.

More specifically, from time t0 to time t1, the battery charging process is in the constant-current charging phase, and the DC/DC converter 200 charges the battery 210 with a constant charging current, which is equal to the target value for the battery charging current $I_{TAR}$. During the constant-current charging phase (time t0-t1), the battery voltage $V_B$ is less than the target value for the battery voltage $V_{TAR}$ (e.g., the reference voltage signal VREF), and therefore the error amplifier 304 sinks current and the error amplifier 306 does not sink current. The bias current source 308 sources the current to the terminal SLEW2 so that the voltage of the loop control signal 214 increases. Therefore, the DC/DC controller 202 increases the output voltage $V_{OUT}$ (i.e., $V_A$) and the battery voltage $V_B$ according to the loop control signal 214 received at the terminal SLEW1 (e.g., by increasing the duty cycle of the pulse width modulated signal PWM1).

At time t1, the battery voltage $V_B$ increases to the target value for the battery voltage $V_{TAR}$ (e.g., the reference voltage signal VREF), and the battery charging process changes from the constant-current charging phase to the constant-voltage charging phase. From time t1 to time t2, the battery charging process is in the constant-voltage charging phase, i.e. the battery voltage is equal to the target value for the battery voltage $V_{TAR}$ (e.g., the reference voltage signal VREF) and the battery charging current gradually decreases from the target value for the battery charging current $I_{TAR}$ to a predetermined current value (e.g., 0). The error amplifier 304 stops sinking current and the error amplifier 306 starts to sink current. Since the error amplifier 306 replaces the error amplifier 304 to sink current, the voltage of the loop control signal 214 at the terminal SLEW1 maintains substantially unchanged. Therefore, the DC/DC controller 202 maintains the output voltage $V_{OUT}$ and the battery voltage $V_B$ substantially unchanged according to the loop control signal 214.

As shown in FIG. 4, during the period from time t1 to t2, the output voltage $V_{OUT}$ does not completely remain unchanged. The reason is that the battery voltage $V_B$ remains unchanged and the battery charging current gradually decreases, so that there will be a slight change to the voltage drop between the two ends of the resistor R4. The output voltage $V_{OUT}$ is equal to the constant battery voltage $V_B$ plus the voltage drop between the two ends of the resistor R4. Therefore, the output voltage $V_{OUT}$ will also decrease slightly, by a negligible amount small enough to be considered substantially unchanged. Herein, the term "substantially unchanged" means that the output voltage $V_{OUT}$ can change as long as the effect on the resistor R4 is small enough to be considered negligible.

Also, the output voltage $V_{OUT}$ and the loop control signal 214 have similar waveform shapes. The numerical values of these two signals can be either the same or different.

Figure 5:
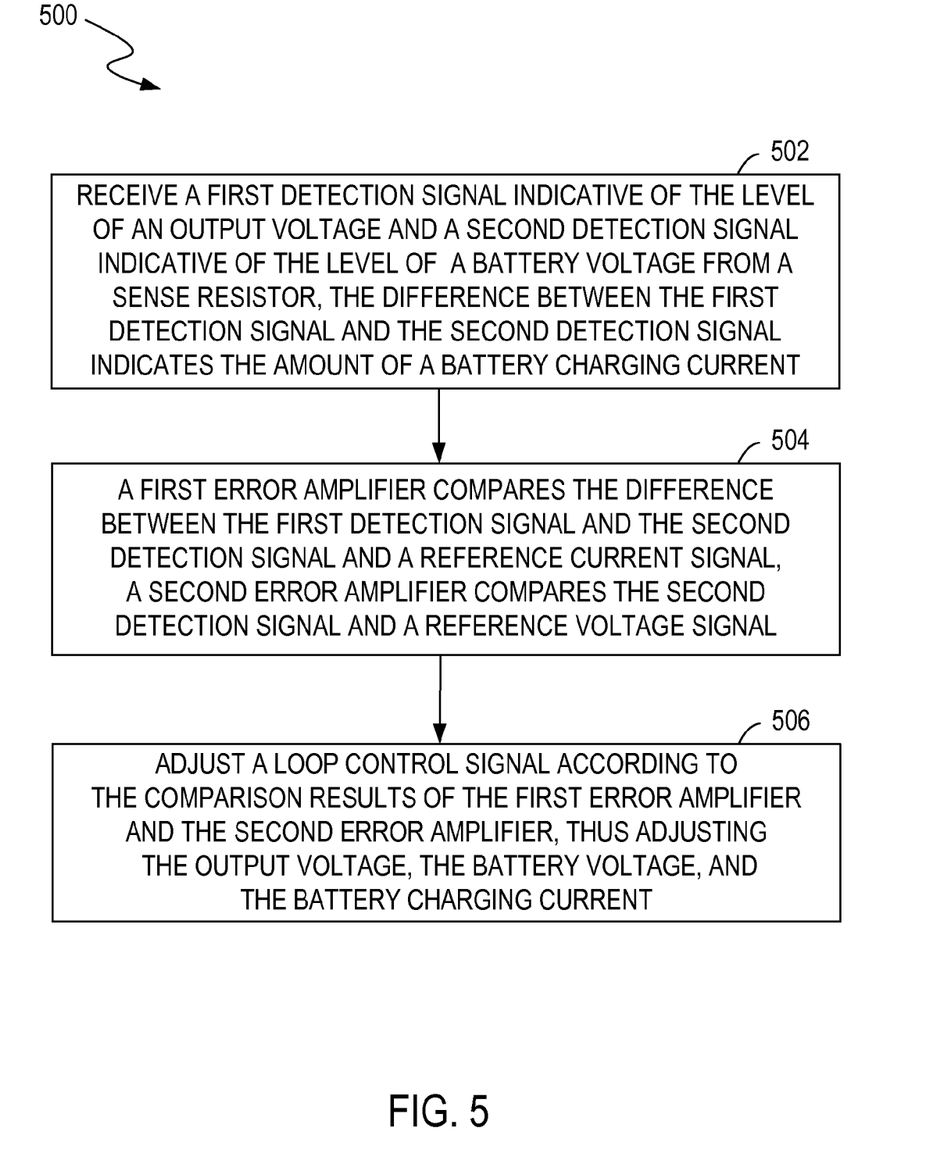
FIG. 5 is a flowchart illustrating an example of a battery charging control method in an embodiment according to the present disclosure.

FIG. 5 is a flowchart illustrating an example of a battery charging control method 500 in an embodiment according to the present disclosure. FIG. 5 is described in combination with FIG. 2 to FIG. 4; however, it is not limited to those embodiments.

At block 502, a first detection signal indicative of the level of an output voltage and a second detection signal indicative of the level of a battery voltage are received from a sense resistor, where the difference between the first detection signal and the second detection signal indicates the amount of a battery charging current.

For example, the terminals ICHP and ICHM of the battery charging controller 212 respectively receive the first detection signal (e.g., the voltage value $V_A$) indicative of the level of the output voltage (e.g., $V_{OUT}$) and the second detection signal (e.g., the voltage value $V_B$) indicative of the level of the battery voltage. The difference between the voltages $V_A$ and $V_B$ can indicate the amount of current flowing through the sense resistor R4, i.e., the battery charging current of the battery 210.

At block 504, a first error amplifier compares the difference between the first detection signal and second detection signal and a reference current signal, and a second error amplifier compares the second detection signal and a reference voltage signal.

For example, the error amplifier 302 compares the voltage $V_A$ and $V_B$ (i.e., the first detection signal and the second detection signal) at the terminals ICHP and ICHM, and generates an output 303 indicative of the difference between the voltages $V_A$ and $V_B$ (i.e., the battery charging current of the battery 210). The error amplifier 304 (i.e., the first error amplifier) compares the output 303 of the error amplifier 302 and the reference current signal IREF at the terminal ISET (indicative of the target value for the battery charging current $I_{TAR}$). The error amplifier 306 (i.e., the second error amplifier) compares the voltage $V_B$ at the terminal ICHM (i.e., the second detection signal) and the reference voltage signal VREF at the terminal VSET (indicative of the target value for the battery voltage $V_{TAR}$).

At block 506, under the combined effect of the first error amplifier, the second error amplifier, and a bias current source, the battery charging controller adjusts a loop control signal according to the comparison results of the first error amplifier and the second error amplifier, thus adjusting the output voltage, the battery voltage, and the battery charging current.

For example, under the combined effect of the error amplifiers 304, 306 and the bias current source 308, the battery charging controller 212 adjusts the loop control signal 214 at the terminal SLEW2 according to the comparison results of the error amplifiers 304 and 306, thus adjusting the output voltage of the DC/DC converter 200, the battery voltage, and the battery charging current. In one embodiment, the error amplifiers 304 and 306 are specially designed only to sink current, and not to source current. However, one skilled in the art will understand that the above description is to be considered in all respects as illustrative and not restrictive.

More specifically, the battery charging process generally includes two phases, respectively called the constant-current charging phase and the constant-voltage charging phase. With the waveforms of FIG. 4, from time t0 to time t1, the battery charging process is in the constant-current charging phase, and the DC/DC converter 200 charges the battery 210 with a constant charging current, which is equal to the target value for the battery charging current $I_{TAR}$. During the constant-current charging phase (time t0 to t1), the battery voltage $V_B$ is less than the target value for the battery voltage $V_{TAR}$ (e.g., the reference voltage signal VREF), and therefore the error amplifier 304 sinks current and the error amplifier 306 does not sink current. The bias current source 308 sources the current to the terminal SLEW2 so that the voltage of the loop control signal 214 increases. Therefore, the DC/DC controller 202 increases the output voltage $V_{OUT}$ (i.e., $V_A$) and the battery voltage $V_B$ according to the loop control signal 214 received at the terminal SLEW1 (e.g., by increasing the duty cycle of the pulse width modulated signal PWM1).

At time t1, the battery voltage $V_B$ increases to the target value for the battery voltage $V_{TAR}$ (e.g., the reference voltage signal VREF), and the battery charging process changes from the constant-current charging phase to the constant-voltage charging phase. From time t1 to time t2, the battery charging process is in the constant-voltage charging phase, i.e., the battery voltage is equal to the target value for the battery voltage $V_{TAR}$ (e.g., the reference voltage signal VREF) and the battery charging current gradually decreases from the target value for the battery charging current $I_{TAR}$ to a predetermined current value (e.g., 0). The error amplifier 304 stops sinking current and the error amplifier 306 starts to sink current. Since the error amplifier 306 sinks current in place of the error amplifier 304, the voltage of the loop control signal 214 at the terminal SLEW1 remains substantially unchanged. Therefore, the DC/DC controller 202 maintains the output voltage $V_{OUT}$ and the battery voltage $V_B$ substantially unchanged according to the loop control signal 214.

As shown in FIG. 4, during the period from time t1 to t2, the output voltage $V_{OUT}$ does not completely remain unchanged. The reason is that the battery voltage $V_B$ remains unchanged and the battery charging current gradually decreases, so that there will be a slight change to the voltage drop between the two ends of the resistor R4. The output voltage $V_{OUT}$ is equal to the constant battery voltage $V_B$ plus the voltage drop between the two ends of the resistor R4. Therefore, the output voltage $V_{OUT}$ will also decrease slightly, by a negligible amount and so is considered to be substantially unchanged.

Advantageously, the present invention utilizes the loop control between the battery charging controller and the DC/DC controller to provide variable output voltages and to meet the application requirement for battery charging.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

We claim:

1. A DC/DC converter, operable for converting a DC input voltage to a DC output voltage and for charging a battery, wherein the DC/DC converter comprises:
a DC/DC controller, operable for generating a driving signal according to a target value for the output voltage and a first detection signal indicative of the output voltage level to control a switching circuitry and to adjust the output voltage level; and
a battery charging controller, coupled to the DC/DC controller and the battery, that is operable for receiving the first detection signal indicative of the output voltage level and a second detection signal indicative of a battery voltage level, and for generating a loop control signal according to the first detection signal and the second detection signal to adjust the target value for the output voltage, wherein the difference between the first detection signal and the second detection signal indicates an amount of a battery charging current, wherein the battery charging controller comprises:
a first error amplifier, operable for comparing the difference between the first detection signal and the second detection signal and a reference current signal indicative of a target value for the battery charging current;
a second error amplifier, operable for comparing the second detection signal and a reference voltage signal indicative of a target value for the battery voltage; and
a bias current source, coupled to the first error amplifier and the second error amplifier, that is operable for adjusting the loop control signal according to the comparison results of the first error amplifier and the second error amplifier, thus adjusting the target value for the output voltage.

2. The DC/DC converter according to claim 1, wherein:
if the second detection signal is less than the reference voltage signal, then the DC/DC converter charges the battery with a current value equal to the target value for the battery charging current, the first error amplifier sinks current and the second error amplifier does not sink current, and the bias current source increases the loop control signal so that the output voltage and the battery voltage accordingly increase; and
if the second detection signal is not less than the reference voltage signal, then the DC/DC converter charges the battery with a voltage value equal to the target value for the battery voltage, the first error amplifier does not sink current and the second error amplifier sinks current, and the bias current source maintains the loop control signal substantially unchanged so that the output voltage and the battery voltage remain substantially unchanged.

3. The DC/DC converter according to claim 2, wherein when the DC/DC converter charges the battery with the constant voltage, the battery charging current gradually decreases from the target value for the battery charging current to a predetermined current value.

4. The DC/DC converter according to claim 1, wherein the driving signal is a pulse-width modulation signal, and the DC/DC controller adjusts the output voltage by adjusting the duty cycle of the pulse-width modulation signal.

5. The DC/DC converter according to claim 4, wherein the pulse-width modulation signal has a first state and a second state, wherein:
if the pulse-width modulation signal is in the first state, then the switching circuitry is driven into a switch on state and the current flowing through an inductor in the DC/DC converter increases; and
if the pulse-width modulation signal is in the second state, then the switching circuitry is driven into a switch off state and the current flowing through the inductor in the DC/DC converter decreases.

6. A battery charging controller, operable for controlling the charging of a battery by a DC/DC converter, wherein the DC/DC converter converts a DC input voltage to a DC output voltage, and wherein the battery charging controller comprises:
a first error amplifier, operable for comparing the difference between a first detection signal indicative of the output voltage and a second detection signal indicative of a battery voltage and a reference current signal indicative of a target value for a battery charging current, wherein the difference between the first detection signal and the second detection signal indicates an amount of the battery charging current;
a second error amplifier, operable for comparing the second detection signal and a reference voltage signal indicative of a target value for the battery voltage; and
a bias current source, coupled to the first error amplifier and the second error amplifier, that is operable for adjusting a loop control signal according to the comparison results of the first error amplifier and the second error amplifier, thus adjusting a target value for the output voltage so that a DC/DC controller coupled to the battery charging controller accordingly adjusts the output voltage.

7. The battery charging controller according to claim 6, wherein:
if the second detection signal is less than the reference voltage signal, then the DC/DC converter charges the battery with a current value equal to the target value for the battery charging current, the first error amplifier sinks current and the second error amplifier does not sink current, and the bias current source increases the loop control signal so that the output voltage and the battery voltage accordingly increase; and
if the second detection signal is not less than the reference voltage signal, then the DC/DC converter charges the battery with a voltage value equal to the target value for the battery voltage, the first error amplifier does not sink current and the second error amplifier sinks current, and the bias current source maintains the loop control signal substantially unchanged so that the output voltage and the battery voltage remains substantially unchanged.

8. The battery charging controller according to claim 7, wherein when the DC/DC converter charges the battery with the constant voltage, the battery charging current gradually decreases from the target value for the battery charging current to a predetermined current value.

9. The battery charging controller according to claim 6, wherein the DC/DC controller is operable for generating a driving signal according to the target value for the output voltage and the first detection signal to control a switching circuitry and adjust the output voltage.

10. The battery charging controller according to claim 9, wherein the driving signal is a pulse-width modulation signal, and the DC/DC controller adjusts the output voltage by adjusting the duty cycle of the pulse-width modulation signal.

11. The battery charging controller according to claim 10, wherein the pulse-width modulation signal has a first state and a second state, wherein:
   if the pulse-width modulation signal is in the first state, then the switching circuitry is driven into a switch on state and the current flowing through an inductor in the DC/DC converter increases; and
   if the pulse-width modulation signal is in the second state, then the switching circuitry is driven into a switch off state and the current flowing through the inductor in the DC/DC converter decreases.

12. A battery charging control method, comprising:
   comparing, by a first error amplifier, the difference between a first detection signal indicative of a level of an output voltage and a second detection signal indicative of level of a battery voltage and a reference current signal indicative of a target value for a battery charging current, the output voltage converted from an input voltage by a DC/DC converter, wherein the difference between the first detection signal and the second detection signal indicates an amount of the battery charging current;
   comparing, by a second error amplifier, the second detection signal and a reference voltage signal indicative of a target value for the battery voltage; and
   adjusting, by a bias current source coupled to the first error amplifier and the second error amplifier, a loop control signal according to the comparison results of the first error amplifier and the second error amplifier, thus adjusting a target value for the output voltage so that a DC/DC controller coupled to the battery charging controller accordingly adjusts the level of the output voltage.

13. The battery charging control method according to claim 12, wherein:
   if the second detection signal is less than the reference voltage signal, then the DC/DC converter charges the battery with a current value equal to the target value for the battery charging current, the first error amplifier sinks current and the second error amplifier does not sink current, and the bias current source increases the loop control signal so that the output voltage and the battery voltage accordingly increase; and
   if the second detection signal is not less than the reference voltage signal, then the DC/DC converter charges the battery with a voltage value equal to the target value of the battery voltage, the first error amplifier does not sink current and the second error amplifier sinks current, and the bias current source maintains the loop control signal substantially unchanged so that the output voltage and the battery voltage remains substantially unchanged.

14. The battery charging control method according to claim 13, wherein when the DC/DC converter charges the battery with the constant voltage, the battery charging current gradually decreases from the target value of the battery charging current to a predetermined current value.

15. The battery charging control method according to claim 12, wherein the DC/DC controller is operable for generating a driving signal according to the target value of the output voltage and the first detection signal so as to control a switching circuitry and adjust the output voltage.

16. The battery charging control method according to claim 15, wherein the driving signal is a pulse-width modulation signal, and the DC/DC controller adjusts the output voltage by adjusting the duty cycle of the pulse-width modulation signal.

17. The battery charging control method according to claim 16, wherein the pulse-width modulation signal has a first state and a second state, wherein:
   if the pulse-width modulation signal is in the first state, then the switching circuitry is driven into a switch on state, and the current flowing through an inductor in the DC/DC converter increases; and
   if the pulse-width modulation signal is in the second state, then the switching circuitry is driven into a switch off state, and the current flowing through the inductor in the DC/DC converter decreases.

* * * * *